No. 870,362. PATENTED NOV. 5, 1907.
W. D. HARRELL & J. E. McNOWN.
BUNDLER AND BINDER.
APPLICATION FILED FEB. 27, 1907.

Witnesses
J. P. Britt
E. C. Duffy

Inventors
W. D. Harrell
J. E. McNown
By C. E. Duffy & Son
Attorneys

UNITED STATES PATENT OFFICE.

WILLIAM DRAKE HARRELL AND JOSEPH EDWIN McNOWN, OF LAGRO, INDIANA.

BUNDLER AND BINDER.

No. 870,362.      Specification of Letters Patent.      Patented Nov. 5, 1907.

Application filed February 27, 1907. Serial No. 359,594.

*To all whom it may concern:*

Be it known that we, WILLIAM DRAKE HARRELL and JOSEPH EDWIN McNOWN, citizens of the United States, residing at Lagro, in the county of Wabash and State of Indiana, have invented certain new and useful Improvements in Bundlers and Binders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to fodder bundler and binder, and has for its object to provide a device of this class wherein fodder, such as corn-shucks or any other like material, can be quickly and easily made into bundles and securely bound in such manner that the bundles will be small and compact and a great saving will be effected in the string or cord with which the bundles are bound.

A further object of our invention is to provide a fodder bundler and binder which can be operated by one man, the device being so arranged that the bundles can be securely held while being bound with a suitable cord or twine.

With these objects in view our invention consists in the novel construction of the machine, and particularly in the novel construction of the curved crane or lever, and also in combination of the crane or lever with a double slide arm upon which the fodder is placed.

Figure 1:
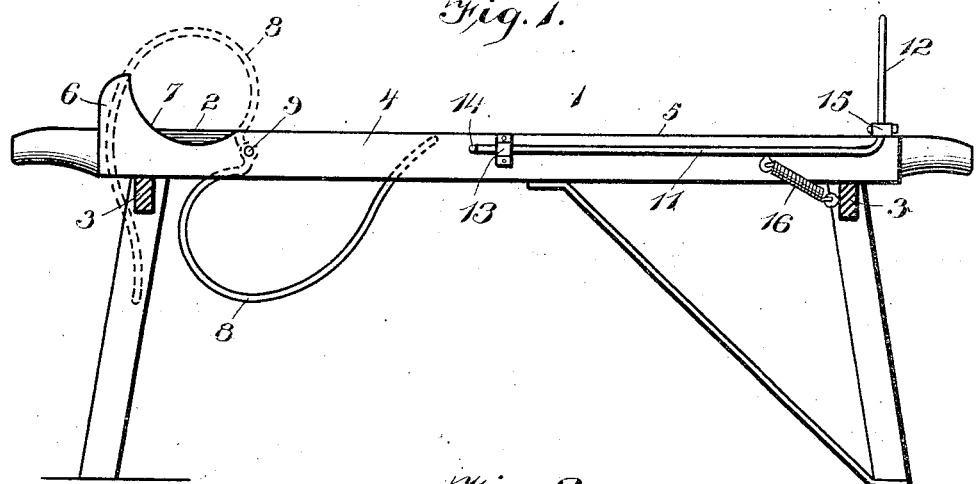
Figure 2:
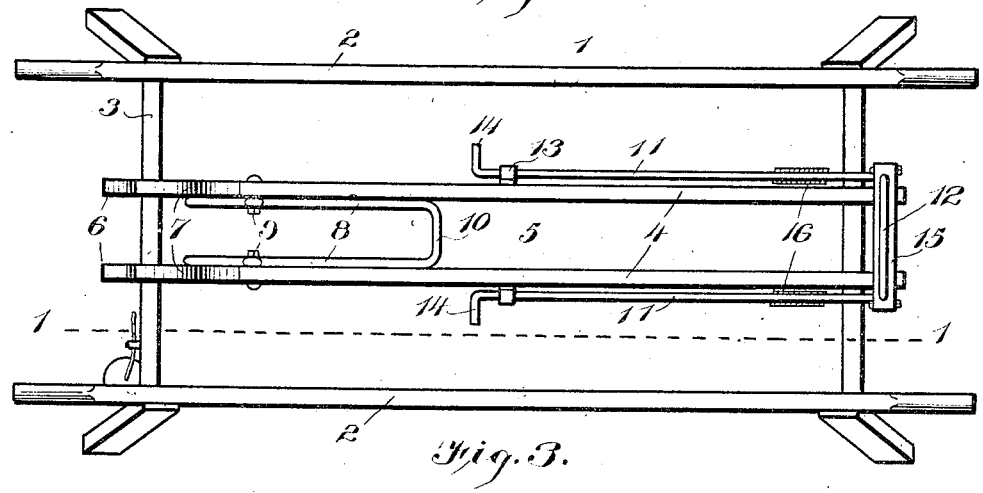
Figure 3:
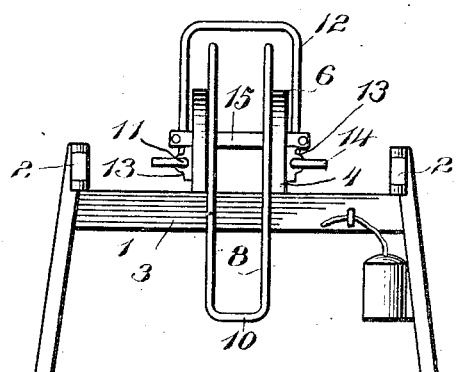

Referring to the accompanying drawing: Figure 1 is a vertical longitudinal sectional view taken on line 1—1 of Fig. 2. Fig. 2 is a top plan view of the machine, and Fig. 3 is an end view thereof.

Like numerals of reference indicate the same parts throughout the several figures in which:

1 indicates the machine which comprises the longitudinal frame pieces 2, the transverse pieces 3, the parallel pieces 4 forming the table 5, said pieces 4 being provided with an upwardly extending portion 6 at the forward end thereof, said pieces being cut away at 7 on the arc, as shown in Fig. 1.

8 indicates the curved lever or crane, which as shown in Fig. 1 is pivoted to the pieces 4 at the point 9, and it will be seen by referring to Fig. 2 that the stirrup 10 is formed by the free end of said lever.

11 indicates the double slide-arm which as shown in Fig. 1 is provided with an upward extension 12 at the rear end thereof, said sliding arm operating in slides 13 as shown, and the forward ends of said arm being bent outwardly at 14 so that it may be grasped and operated by the operator. A guiding slide 15 is secured to the upward extension 12 of the double slide arm 11, said guiding slide operating on the upper edge of the parallel pieces 4, as shown in Figs. 1 and 2; while a spring 16 connected to said sliding arm is provided for normally holding the said sliding arm in position, shown in Fig. 1.

A cord or twine box is conveniently arranged at the front end of the machine accessible to the operator.

Having thus described the several parts of our invention its operation is as follows: The shucks or fodder or other material to be bundled and bound are placed upon the table 5 above the double sliding arm 11, and when a sufficient quantity has been so placed the operator stands at the front end of the machine and the curved crane or lever 8 being in position shown in full lines in Fig. 1, the double sliding arm 11 is grasped by the operator and drawn forward, the upward extension 12 of the double sliding arm carrying the fodder forwardly until it lies on the table directly above the curved crane or lever 8. When in this position the curved crane or lever is thrown forward into position shown in dotted lines in Fig. 1 and the foot of the operator is placed in the stirrup 10 at the end of said curved crane or lever and pressure being applied the fodder is compressed into a small cylindrical bundle, the curve in the crane or lever and the cut away portion in the pieces 4 forming together substantially a circle and therefore compresses the bundle into that form. The fodder being thus held in the cylindrical bundle the same is bound with suitable cord or twine and tied, after which the curved crane or lever 8 is thrown back into position shown in full lines in Fig. 1 and the bundle removed. The operation is extremely simple, and the fodder or other material can be bundled or bound very rapidly, as is of course obvious.

Having thus fully described our invention, what we claim as new and desire to secure by Letters Patent of the United States, is,—

In a bundler and binder of the character described, the combination of two parallel pieces forming a table and having a portion thereof cut away on an arc of a circle, a curved crane or lever associated with said table, one end of said curved crane or lever forming a stirrup, said lever being arranged to form substantially a circle with the said cut away portion of said table and a sliding arm associated with said table for drawing the fodder in position to be engaged by said curved crane or lever, substantially as described.

In testimony whereof, we affix our signatures, in presence of two witnesses.

WILLIAM DRAKE HARRELL.
           JOSEPH EDWIN McNOWN.

Witnesses:
  F. H. BLOOMER,
  D. R. BURR.